United States Patent [19]

Prater

[11] 4,153,314
[45] May 8, 1979

[54] HANDLE ASSEMBLY

[75] Inventor: Earle F. Prater, Long Beach, Calif.

[73] Assignee: The Birtcher Corporation, Los Angeles, Calif.

[21] Appl. No.: 883,490

[22] Filed: Mar. 6, 1978

[51] Int. Cl.² ............................................. A47B 95/02
[52] U.S. Cl. .................................... 312/320; 312/239; 312/244; 16/110 R; 220/3.5
[58] Field of Search ............ 312/320, 244, 239, 234.4, 312/42; 220/3.5, 3.6, 3.9; 16/110 R, 110 A, 110.5

[56] References Cited

U.S. PATENT DOCUMENTS

| | | | |
|---|---|---|---|
| 1,304,700 | 5/1919 | Otte | 312/320 |
| 1,898,282 | 2/1933 | Almcrantz | 220/3.9 |
| 2,263,885 | 11/1941 | McGauley | 16/110 R |
| 3,098,686 | 7/1963 | Benoit | 312/320 |
| 3,572,870 | 3/1971 | Marks | 16/110 R |
| 3,621,510 | 11/1971 | Rollins, Jr. | 16/114 R |
| 3,646,634 | 3/1972 | Fusselman | 312/320 |
| 3,932,010 | 1/1976 | Kenworthy | 312/320 |
| 4,040,695 | 8/1977 | Brann | 312/320 |
| 4,090,757 | 5/1978 | Frey et al. | 312/320 |

FOREIGN PATENT DOCUMENTS 1190619  4/1965  Fed. Rep. of Germany ........... 312/320

Primary Examiner—Victor N. Sakran
Attorney, Agent, or Firm—Harold L. Jackson; Stanley R. Jones; Joseph W. Price

[57] ABSTRACT

A recessed handle assembly adapted for use in cases, panels and more particularly in electrical housing assembly units is disclosed. An aperture is provided in a wall of an electrical housing assembly unit. Into the aperture is placed a handle member which is preferably U shaped and is equipped with a pair of flanges. The flanges engage the exterior surface of the panel. A keeper member which also has a pair of flanges is mounted between the panel and the handle member. The keeper member is of such dimensions that it tightly fits between the panel and the handle member while the flanges of the keeper member engage the interior surface of the panel. The whole assembly is held together by a spring force which results from tight fit of the keeper member between the panel and the handle member. The handle assembly of this invention can be mounted into a panel in a very short time without the use of tools or mechanical skills.

9 Claims, 9 Drawing Figures

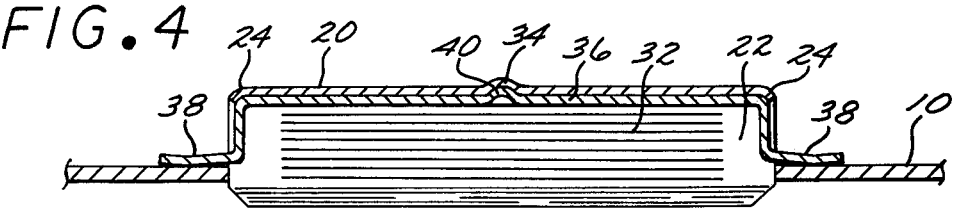
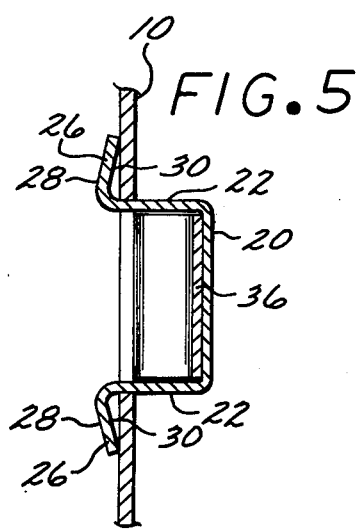
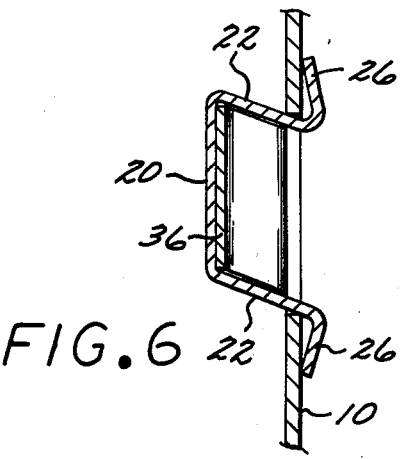
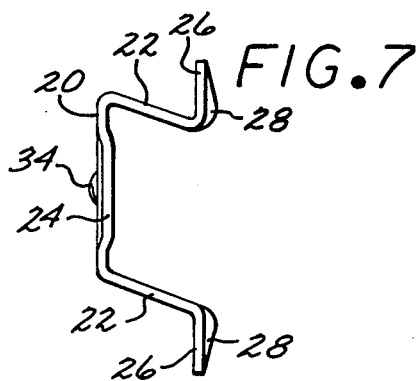
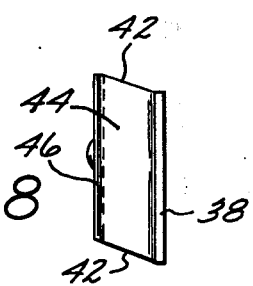
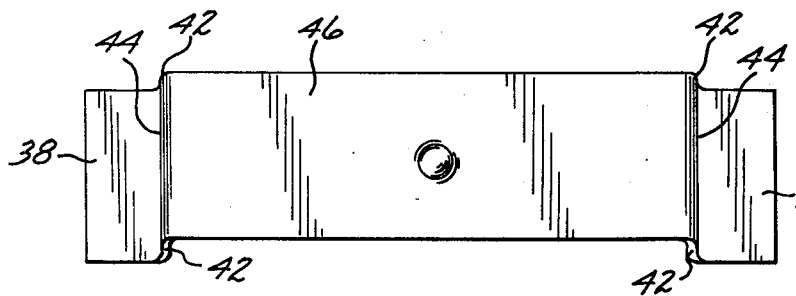

HANDLE ASSEMBLY

BACKGROUND OF THE INVENTION

1. Field of the Invention

The present invention is directed to a handle assembly for use in panels, cases and the like and more particularly to a two piece handle assembly for electrical housing assembly units.

2. Description of the Prior Art

Handles for cases of various electrical devices such as electrical housing assembly units, tape recorders, record players and the like usually comprise a hinged member which either protrudes or can be caused to protrude from an outer surface of the case.

Alternatively handles for the above mentioned devices frequently comprise a cavity or groove which is built or molded into the outer surface of the electrical housing, such a cavity or groove enables the operator to manipulate the electrical housing assembly unit.

Specific examples of the prior art can be obtained from Marks' U.S. Pat. No. 3,572,870, Mitchell's U.S. Pat. No. 1,958,587 and Rollin's U.S. Pat. No. 3,621,510.

The Marks patent discloses an extensible and retractable handle assembly for portable cases and the like. The handle is snapped into a retracted position by the depression of the handle itself and is held therein by a suitable latching mechanism. Suitable springs cause extension of the handle upon further depression of the handle when it is in the retracted position.

The Mitchell patent discloses a handle member which is held flatly against the outer surface of the case by the force of springs located in the inside of the case, and which is extended therefrom by a pulling force exerted by the person wishing to hold the handle.

The Rollins patent discloses a protruding handle assembly for electrical modules and the like which is mounted into an aperture placed in the wall of an electrical housing module, and which is held therein by a spring force.

As it can be readily appreciated, a handle protruding from the wall of an electrical housing assembly unit is often undesirable from the standpoint of storing the electrical housing units in a tight space. Furthermore, practical and commercial acceptance of the handle depends not only on its cost, but also on the ease of mounting the handle into the unit.

In view of the foregoing, there is still a need in the prior art for a handle which is simple, inexpensive to manufacture, easily mounted into the electrical housing assembly unit, and is also adaptable for installation in electrical housings already in existence.

SUMMARY OF THE INVENTION

The present invention is directed to a recessed handle assembly for cases, panels and more particularly for electrical housing assembly units.

An object of this invention is to provide a handle for electrical housing assembly units which permits tight-packed storage of the units.

Another object of this invention is to provide a recessed handle which is inexpensive to manufacture.

Yet another object of this invention is to provide a recessed handle for electrical housing assembly units which is readily mounted in its place without the use of screws, tools or mechanical skills.

According to the present invention, the foregoing and other objects are attained by an aperture placed into a panel constituting a wall of the electrical housing. A handle member having two flanges is inserted into the aperture so that the two flanges engage the outer surface of the panel. A keeper member, also having two flanges is placed between the handle member and the panel, two flanges of the keeper member engaging the inner surface of the panel.

The handle and the keeper members are of such dimensions that the keeper member fits tightly but removably, between the handle member and the panel. As a result of the tight fit and of the inherent elasticity of the material from which the handle and keeper members are manufactured, a spring force is exerted upon each other by the panel, handle and keeper members, the spring force keeping the handle securely in place.

In the preferred embodiments, both the handle member and the keeper member have a substantially U-shaped cross-section. The edges of the main body portion of the handle member are bent towards the panel, so as to provide additional spring force relative to the keeper member positioned between the handle member and the panel, and to prevent its accidental dislocation.

The nature of this invention and its features which are believed to be novel, will be best understood by reference to the accompanying specification and drawings.

BRIEF DESCRIPTION OF THE DRAWINGS

FIG. 4 is a sectional view of the first specific embodiment of the present invention, showing the keeper member in operating position, the section being taken at lines 4 of FIG. 2;

FIG. 5 is a sectional view of the first specific embodiment of the present invention, showing the keeper member in operating position; the section being taken at lines 5 of FIG. 2;

FIG. 6 is a sectional view of a second specific embodiment of the present invention showing the keeper in operating position, the section being taken at lines similarly situated as lines 5 on FIG. 2;

FIG. 7 is a plan side view of the handle member of the second specific embodiment of the present invention;

FIG. 8 is a plan side view of the keeper member of a second specific embodiment of the present invention, and, FIG. 9 is a top plan view of the keeper member of the second specific embodiment of the present invention.

DESCRIPTION OF THE PREFERRED EMBODIMENTS

The following specification taken in conjunction with the drawings sets forth the preferred embodiment of the present invention in such a manner that any person skilled in the art of manufacturing handles can use the invention. The embodiments of the invention disclosed herein are the best modes contemplated by the inventor for carrying out his invention in a commercial environment, though it should be understood that various modifications can be accomplished within the parameters of the present invention.

Figure 1:
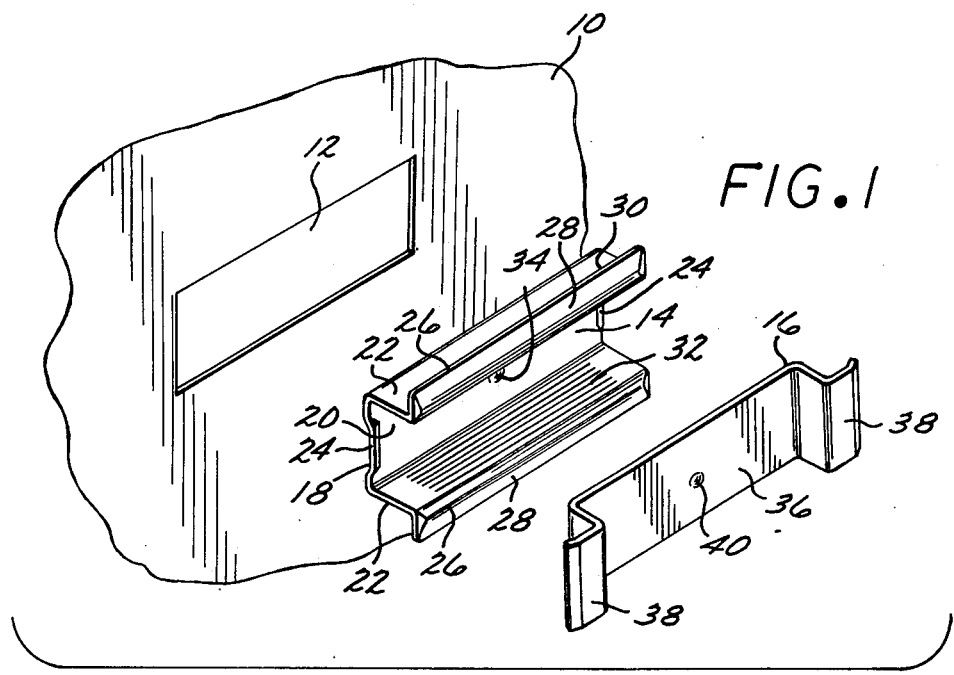
FIG. 1 is a front perspective exploded view of a first specific embodiment of the present invention.
Figure 2:
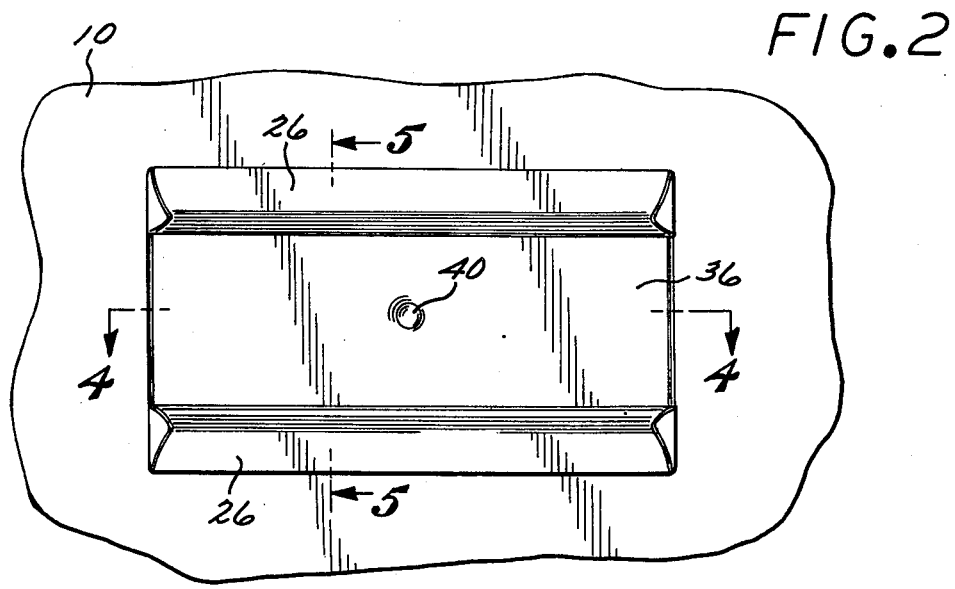
FIG. 2 is a front plan view of the first specific embodiment of the present invention.
Figure 3:
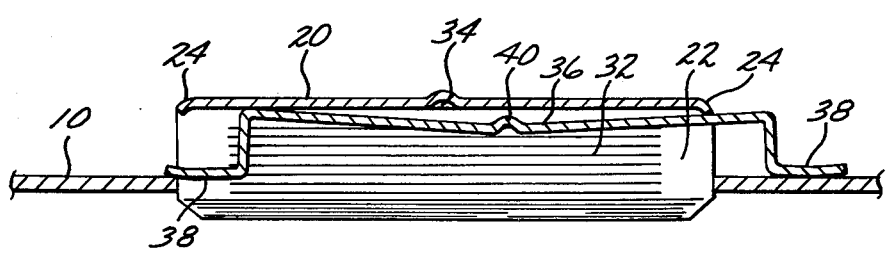
FIG. 3 is a sectional view of the first specific embodiment of the present invention, showing the keeper member as it is placed into position, the section being taken at lines 4 of FIG. 2.

Referring to the perspective view of FIG. 1 a panel 10 having a rectangular aperture 12, a handle member 14 and a keeper member 16 are disclosed.

The panel 10 may be manufactured in such a manner so as to contain aperture 12, or the aperture 12 may be cut into the panel. The fact that the aperture can be cut into the panel provides an additional advantage for this invention, in that the recessed handle comprising the subject of this invention can be used with an existing case or electrical housing after an aperture of the requisite size and shape is cut thereinto.

The handle member 14, as shown in FIGS. 1, 3, 4 and 5 has a main body portion 18 of substantially a U-shaped cross-section. The main body portion 18 comprises a base plate 20 and two parallel side plates 22, each of which is orthogonal to the base plate 20. The base plate 20 has its two edges slightly bent towards the inner surface of the panel 10, the purpose of these bends 24 will be better understood as the assembly of the handle is explained below. Flanges 26 having a slightly rounded decorative front surface 28 and a back surface 30, extend from each of the side plates 22. The back surface 30 of the flanges 26 may be in a plane substantially parallel with the plane of the panel 10, or it may form an acute angle with the side plates 22. The acute angle between back surface 30 of the flange 26 and the side plate 22 is best seen in FIG. 5; by bending the flanges 26 towards the panel, it is possible to increase the depth of the handle member 14, thereby providing for a better grip of the handle by an operator.

In order to further strengthen the grip of an operator on the handle, the handle member 14 may be provided with a multiplicity of grooves or serrations 32 on the side plates 22.

FIG. 1 further illustrates an identation or cavity 34 located substantially centrally on the base plate 20 of handle member 14. Such indentation or cavity may also be in the form of a circular hole, its role in providing added strength of the assembled handle will be best understood below.

During the simple steps of assembling the handle, the handle member 14 is inserted through aperture 12 so that the flanges 26 engage the outer surface of the panel 10.

The keeper member 16 is then inserted through the aperture 12. The keeper member 16 has a main body portion 36 which in this specific embodiment also has a substantially U-shaped cross-section and a pair of legs 38 extending from the main body portion 36.

The legs 38 of the keeper member 16 are slightly bent at the edges, the bends extending outward from the inner surface of the panel 10, thereby facilitating a sliding motion of the keeper member 16 on the inner surface of the panel 10. In the specific embodiment shown in FIGS. 1, 2, 3, 4, and 5, the keeper member 16 is equipped with a protrusion 40 matching the indentation or cavity 34 in the handle member 14. During assembly of the handle, the keeper member 16 is inserted through the aperture 12, or is placed between the handle member 14 and the panel 10 from the rear, inner side of the panel 10, and the keeper member is slid sideways causing the protrusion 40 to snap into indentation 34 when the keeper member is centered in operating position.

The respective dimensions of the handle member 14 and the keeper member 16 are such that the keeper member 16 fits tightly between the handle member 14 and the panel 10 when it is placed in operating position. A relative spring force which is due to the inherent elasticity of the material, such as sheet metal, from which the keeper 16 and handle 14 members are made, holds the handle assembly firmly together.

The bends 24 in the edges of the base plate 20 of the handle member 14, and the indentation 34 and matching protrusion 40 serve the purpose of further stabilizing the handle assembly in its assembled operating position.

On disassembly of the handle, additional force applied to the keeper member 16 by the human operator dislodges the protrusion 40 from identation 34, and overcomes the additional resistant spring force offered by the bends 24 against a sliding motion of the keeper member 16, and the keeper member is removed from position.

As mentioned above, the handle 14 and keeper 16 members can be readily manufactured by simple and inexpensive sheet metal stamping, since such sheet metal stampings possess sufficient elasticity and rigidity to provide the spring force necessary to hold the assembly together. However, the invention is not intended to be limited to the use of sheet metal since other suitable materials for the construction of this handle may be available.

It is to be understood that while certain features of the above-described specific embodiment such as the serration of the handle member 14 and the indentation 34 in the handle member aligned with matching protrusion 40 are advantageous, they are not necessary for the practice of this invention, and therefore are not to limit the invention in scope.

It is to be further understood that in other embodiments of this invention, a member fitting tightly between another member and the panel 10 may engage the outer surface of the panel 10, with the other member engaging the inner surface, such an embodiment still being within the scope of the present invention.

In still other preferred embodiments, additional biasing means such as springs or a rubber gasket may be utilized to hold the handle and keeper members in position.

FIGS. 6, 7, 8 and 9, wherein like parts are indicated by like numerals as in FIGS. 1-5, disclose another preferred embodiment of the present invention. In this embodiment, the construction of the handle 14 and keeper 16 members is similar to the construction in the previously described preferred embodiment, except that the base plate 20 and the parallel side plates 22 of the handle member form an angle other than 90°, so that handle member 14 is tilted upward as it is mounted in the aperture 10.

The keeper member 16 has a shape to match the shape of the corresponding handle member 14. Thus, the main body 36 of the keeper member 16 still has a U-shaped cross-section, but the edges 42 of two side plates 44 of keeper member 16 meet base plate 46 and the legs 38 of the keeper member 16 at an angle other than 90°, the angle corresponding to the angle formed between the base plate 20 and the side plates 22 of the handle member 14. The base plate 20 of the handle member 14 has bent edges as in the first described preferred embodiment so as to center and firmly hold the keeper member 16 in its operating positions.

As illustrated by the foregoing, the present invention offers extremely simplified and economical recessed handle assemblies adaptable for use in cases, panels and particularly in electrical housing assembly units, only a minimal amount of time and no tools or mechanical skills being required for assembly or disassembly of the handle comprising the subject matter of this invention. Since various modifications of the generic concepts of this invention are possible, the scope of the present invention is to be determined solely from the following claims.

What is claimed is:

1. A two piece handle assembly adapted for exterior mounting within a panel having a simple cut out aperture comprising;
    a handle member having a U-shaped cross sectional configuration and at least two flanges, the handle member being insertable through said aperture in the panel, the flanges engaging the outer surface of the panel after insertion of the handle member into the aperture, and
    a keeper member having a U-shaped cross-sectional configuration and at least two legs, the keeper member being of such dimensions so as to enable the keeper member's legs to tightly slide between the handle member and the panel when their U-shaped cross-sectional configurations are arranged traverse to each other, and capable of providing a closed space, the keeper member being inserted in the aperture in the panel so that each of the legs of the keeper member engage an inside surface of the panel, at an end of the aperture offset from the outside surface contact of the handle member flanges whereby the handle member is kept securely in place, and the handle assembly provides a closed space to prevent access into the panel, and means for locking the respective handle member and keeper member into position when they are assembled into a handle assembly.

2. The invention of claim 1 wherein the handle member comprises a main body portion having a base plate, the base plate having at least two edges, the edges being bent toward the panel having the aperture when assembled so as to align and hold the keeper member when the keeper member is slid between the handle member and the panel.

3. The invention of claim 1 wherein the legs of the keeper member are bent away from the panel containing the aperture so as to facilitate sliding of the keeper member on the inner surface of the panel.

4. The invention of claim 1 wherein the handle member has a cavity, and wherein the keeper member has a protruding portion which fits into the cavity, so that a force applied to slide the keeper member between the handle member and the panel causes the protruding portion to snap into the cavity, thereby locking the keeper member and handle member securely in position.

5. The invention of claim 1 wherein the handle member is provided with a multiplicity of grooves in its outer periphery so as to enable a person to have a strong grip on the handle assembly.

6. The invention of claim 1 wherein the aperture in the panel is rectangular.

7. The invention of claim 6 wherein the handle member comprises a main body portion having a base plate, the base plate having at least two edges, the edges being bent toward the panel having the aperture when assembled so as to align and hold the keeper member when the keeper member is slid between the handle member and the panel.

8. The invention of claim 7 wherein the legs of the keeper member are bent away from the panel having the aperture so as to facilitate sliding of the keeper member of the inner surface of the panel.

9. The invention of claim 7 wherein the handle member is provided with a multiplicity of grooves in its outer periphery so as to enable a person to have a strong grip on the handle assembly.

* * * * *